United States Patent [19]

Tung

[11] 4,138,728
[45] Feb. 6, 1979

[54] ELECTRONIC TACHOMETER WITH VARIABLE BANDWIDTH DIFFERENTIATOR

[75] Inventor: Joseph S. Tung, San Jose, Calif.

[73] Assignee: International Business Machines Corporation, Armonk, N.Y.

[21] Appl. No.: 811,349

[22] Filed: Jun. 29, 1977

[51] Int. Cl.² .......................... G01P 7/00; G06G 7/18
[52] U.S. Cl. ..................................... 364/565; 324/160; 360/78; 364/828
[58] Field of Search ................. 364/565,828; 318/610, 318/611, 618, 619; 328/127; 324/160; 360/77, 78

[56] References Cited

U.S. PATENT DOCUMENTS

| 3,159,741 | 12/1964 | Dahlin | 364/828 |
| 3,216,676 | 11/1965 | Brown et al. | 318/619 |
| 3,273,035 | 9/1966 | Inderhees | 318/619 |
| 3,652,945 | 3/1972 | Nakane et al. | 328/127 |
| 3,820,712 | 6/1974 | Oswald | 324/160 |
| 3,883,894 | 5/1975 | Johnson | 360/78 |
| 3,994,016 | 11/1976 | Moghadam | 360/78 |

FOREIGN PATENT DOCUMENTS 442485  9/1974  U.S.S.R. ................................. 328/127

OTHER PUBLICATIONS

Johnson (Textbook) Analog Computer Techniques, McGraw-Hill, 1956, p. 97.

Primary Examiner—Felix D. Gruber
Attorney, Agent, or Firm—Nathan N. Kallman

[57] ABSTRACT

An electronic tachometer, for use in a disk drive system, to sense velocity of an accessing head mechanism relative to data tracks being accessed, comprises a first feedback loop comprising a variable bandwidth differentiator for receiving a position signal and providing a velocity signal; and a second feedback loop including the differentiator and means for supplying a control voltage to said differentiator in response to a variable velocity signal provided by the differentiator.

7 Claims, 2 Drawing Figures

ELECTRONIC TACHOMETER WITH VARIABLE BANDWIDTH DIFFERENTIATOR

CROSS-REFERENCE TO A RELATED APPLICATION

In U.S. Pat. No. 3,820,712, entitled "Electronic Tachometer," which issued June 28, 1974 on application Ser. No. 340,629 to R. K. Oswald, and is assigned to the same assignee, an electronic tachometer is disclosed in which a continuous velocity output signal is generated from the combination of a discontinuous position signal and a continuous acceleration signal. The signal processing circuitry includes differentiating means employing conventional RC elements and low pass filter means.

BACKGROUND OF THE INVENTION

1. Field of the Invention

This invention relates to an electronic tachometer circuit and in particular to an improved tachometer circuit as may be used in a disk drive system for sensing position and velocity of accessing mechanisms.

2. Description of the Prior Art

Presently known electronic tachometers used with accessing systems, such as linear motors utilized in disk files, provide a position signal and a velocity or acceleration signal. In a disk file, these signals respectively represent the track position and radial movement of the accessing head element relative to a disk surface. As the track density increases and the spacing between data tracks becomes closer, the requirements for precision in sensing and generating these indicator signals become more critical. One problem that arises during the operation of a disk drive employing an electronic tachometer is that during the seek mode, when the accessing mechanism accelerates and decelerates as it moves from one data track to another, the frequency of the sensed position and velocity signals changes relatively rapidly and high frequency noise is introduced. Also, phase shift, amplitude reduction, and non-linearity of the tachometer signal are encountered, particularly at the corner frequency of the differentiator. These problems affect the operation of the curve generator that controls the acceleration and deceleration occurring during the seek mode. As a result, the accessing mechanism may overshoot or undershoot the selected track, or misregistration of the sensing head or transducer with the selected track may occur.

SUMMARY OF THE INVENTION

An object of this invention is to provide a novel and improved electronic tachometer for use in a disk drive system.

Another object of this invention is to provide an electronic tachometer which operates with a constant signal-to-noise ratio.

Another object is to provide an electronic tachometer in which signal amplitude is enhanced and high frequency noise is effectively reduced.

According to this invention, an electronic tachometer comprises a variable bandwidth differentiator that includes a variable gain amplifier, such as a two quadrant multiplier, disposed in an integrating feedback loop. A velocity output signal generated by a second feedback loop including the variable gain amplifier automatically controls the bandwidth of the signal being processed by the differentiator, so that the ratio of sensed velocity to bandwidth remains constant over a range of velocities.

BRIEF DESCRIPTION OF THE DRAWINGS

The invention will be described in greater detail with reference to the drawing in which.

DESCRIPTION OF THE PREFERRED EMBODIMENT

Figure 1:
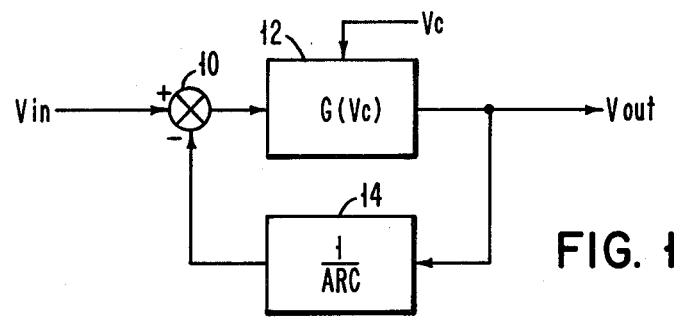
FIG. 1 is a schematic block diagram representing the configuration of an electronic tachometer employing the inventive concept.

With reference to FIG. 1, a variable bandwidth differentiator, such as may be used in an electronic tachometer, includes a subtracter 10. The subtracter receives an input voltage $V_{in}$ representing the position of an accessing mechanism, as it traverses servo tracks that have been prerecorded on a servo disk surface, as is well known in the art. Data tracks are recorded on or read out from the other disk surfaces mounted to the same rotary shaft as the servo disk, and the data tracks follow circular paths that correspond to those delineated by the servo pattern.

The output signal from the subtractor is fed to a variable gain amplifier 12 which also receives a control voltage $V_c$. The control voltage $V_c$ is produced in proportion to the continuous velocity signal processed by the electronic tachometer. The output signal $V_{out}$ of the variable gain amplifier 12 is directed through a closed feedback loop, which includes an integrating RC network 14, that provides an integrated output signal to the input of the subtracter 10. By applying the control voltage $V_c$ to this circuit, the gain can be controlled to vary the corner frequency. When the input frequency $V_{in}$ is at the low frequency portion of the bandwidth and the corner frequency is varied accordingly, high frequency noise is not amplified. Conversely, when the input frequency $V_{in}$ is high, signal linearity is improved. As a result, a constant signal-to-noise ratio is realized.

Figure 2:
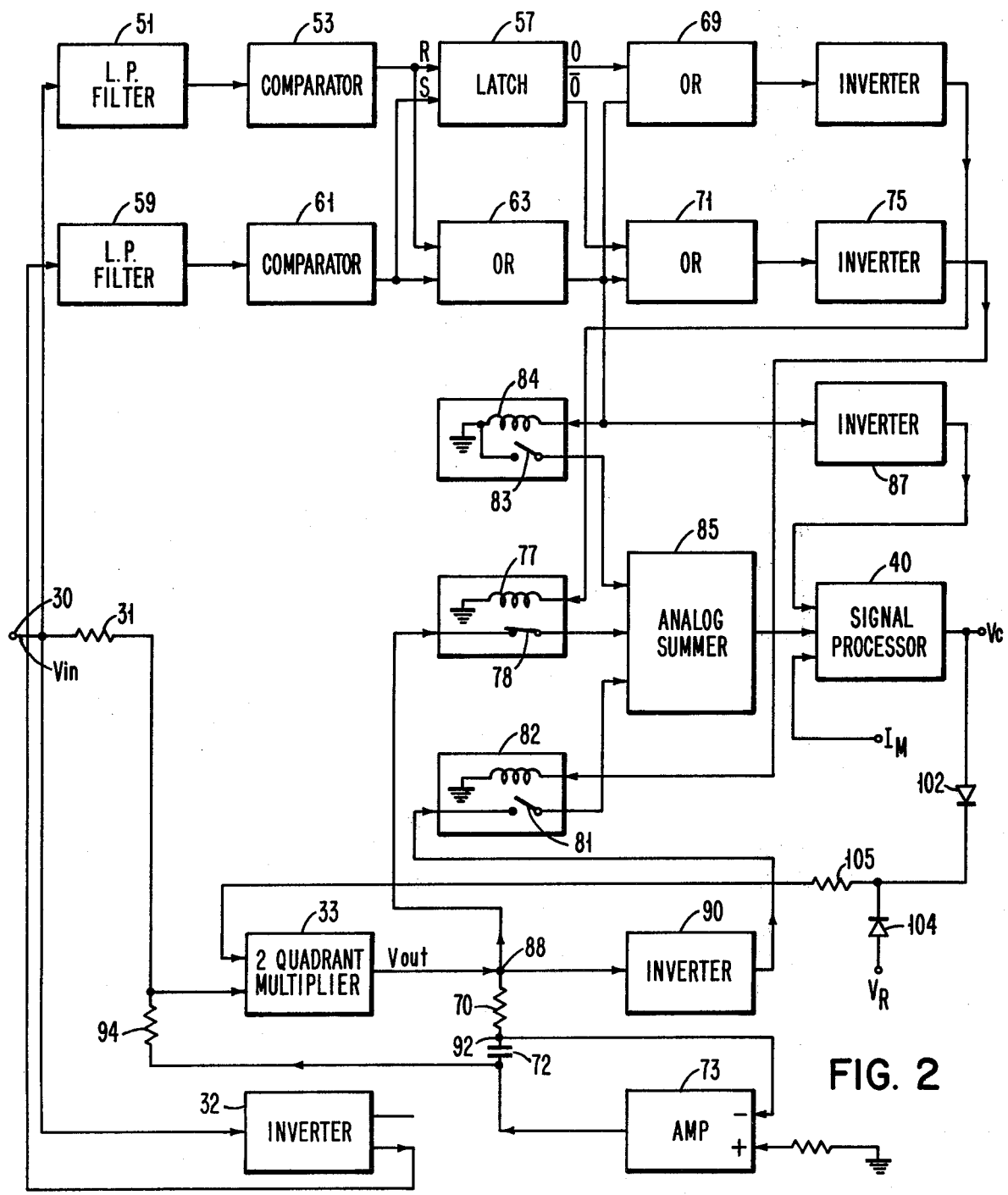
FIG. 2 is a schematic block diagram of an implementation of an electronic tachometer circuit, according to this invention.

An implementation of the electronic tachometer circuit including the variable bandwidth differentiator which is illustrated in FIG. 1, is depicted in greater detail in FIG. 2. It should be noted that, in effect, the differentiator circuits 79 and 80 of U.S. Pat. No. 3,820,712, which serve as high pass filters and are subject to undue phase shift and amplitude variation, have been replaced by a variable gain amplifier, such as a two quadrant multiplier, and an integrating circuit in a closed feedback loop, as disclosed herein.

With reference to FIG. 2, an input voltage $V_{in}$, representing a discontinuous position signal, is supplied to terminal 30 and passed through a resistance 31 to a variable gain amplifier, such as a two quadrant multiplier 33. The input voltage $V_{in}$ may be in range of +5 to −5 volts, by way of example, and represents the position signal derived from the movement of the accessing mechanism radially along the surface of a servo disk, which has a multiplicity of concentric servo tracks registered thereon. The position signal voltage is proportional to the displacement relative to the servo track pattern of the accessing mechanism, which in a disk drive includes a magnetic head assembly.

The output signal $V_{out}$ from the two quadrant multiplier 33 that appears at a terminal 88 is directed to a switch 78 operated by a relay coil 77. Concurrently, the output signal $V_{out}$ is inverted by inverter 90 and the inverted signal is directed to a switch 81 operated by a relay coil 82.

The time generating circuitry illustrated in the top portion of FIG. 2, includes low pass filters 51 and 59, respectively, which serve to eliminate noise. The input signal $V_{in}$ from terminal 30 is fed directly to the filter 51, and an inverted input signal from inverter 32 is fed to filter 59. Comparators 53 and 61 act respectively, to clip the filtered signals from filters 51 and 59 to develop a square wave signal. The output of the comparators 53 and 61 are up whenever the respective input signals are more negative than a predetermined reference signal, which may be −2.5 volts, for example. The comparator output signals are applied to the reset and set inputs respectively of a latch 57 and to the input of an OR gate 63. The output signal from OR gate 63 is applied to OR gate 69 and OR gate 71 and to switch relay coil 84. The output signal from OR gate 63 is also inverted by inverter 87, and the inverted signal is fed to a signal processor 40. The signal processor 40 is structurally and functionally equivalent to that illustrated in FIG. 2 of the aformentioned U.S. Pat. No. 3,820,712. The output signal from OR gate 63 provides a timing signal for use in the forming of a discontinuous position signal, generated by the signal processor 40 and designated as control voltage $V_c$. The control voltage $V_c$ controls the bandwidth of the signal applied to the multiplier 33.

The control voltage $V_c$ is applied to the two quadrant multipler 33 under control of a diode network comprising diodes 102 and 104. When the output signal $V_c$ from the processor 40 is zero, which occurs at the beginning of the access mode, then diode 102 is back biased, and a constant reference voltage $V_R$ from a fixed power supply is applied through diode 104 to the input of the multiplier 33. If $V_c$ is less than the fixed reference voltage $V_R$, diode 104 is conducting and the greater voltage $V_R$ is applied to the multiplier 33. If $V_c$ is greater than the fixed reference voltage $V_R$, then diode 102 conducts and the control voltage $V_c$ is fed to the multiplier 33. The diode clamp network prevents the corner frequency from going to zero.

The $V_c$ signal voltage from the signal processor 40 is passed through resistor 105 to develop a current signal that controls the bandwidth of the variable bandwidth differentiator. The multiplier processes the current signal of positive polarity only, and provides an output signal which is the product of the positive current signal through resistor 105 and the current signal seen through resistor 31. The output signal $V_{out}$ from the multiplier 33 is passed through switch 78, when closed, to the summing amplifier 85. The $V_{out}$ signal is a square wave having an amplitude that is dependent on the frequency of the $V_{in}$ signal, and presents an analog indication of the velocity of the accessing mechanism. The output signal of the summer 85 is applied to the signal processor 40 and is used to generate a velocity signal for the linear motor, or accessing mechanism.

When the output signal from the OR gate 63 is up, ground potential is applied through relay switch 83 to analog summer 85. Also, one output of latch 57 is fed to the input of OR gate 71, and through inverter 75 to the relay coil 82, which energizes switch 81. The closing of switch 81 applies an inverted discontinuous position signal to the summer 85.

The signal processor 40 receives the signal passed through the channel which includes the filter 59, comparator 61, OR gate 63 and inverter 87, and also receives a signal $I_m$ representing current in the coil of the linear motor. The signal processor 40 also receives a signal from the circuit including the multiplier 33 and analog summer 85. The processor 40 generates the control voltage $V_c$ that is passed through the diode network to the multiplier 33. Thus, the processor 40 and multiplier 33 act in a closed feedback loop.

The output signal $V_{out}$ from the multiplier 33 that appears at terminal 88 is passed through an integrating RC circuit comprising resistor 70 and capacitor 72 and operational amplifier 73, tied to a junction 92 between the resistive-capacitive integrator. The output from amplifier 73 is also applied through resistance 94 to provide a current input to the multiplier 33, thereby forming a second closed feedback loop.

By virtue of applying a variable control voltage to a variable linear gain amplifier, which control voltage varies according to the output voltage of said gain amplifier, and by use of an active differentiator having an integrator in a feedback loop, the bandwidth of the signal processed by the tachometer is automatically varied, independent of gain, so that the ratio of velocity to bandwidth is constant over a range of velocities.

What is claimed is:

1. An electronic tachometer for sensing position and velocity of a movable device comprising:
   a variable gain amplifier;
   means for applying a position signal to said gain amplifier;
   a first feedback loop comprising said gain amplifier, and an integrating means coupled to said gain amplifier for providing a velocity signal indicating the velocity of said device;
   a second feedback loop comprising said gain amplifier, means for providing a control signal to said gain amplifier, said control signal varying with relation to variations of said velocity signal, and switching means for energizing said means for providing a control signal.

2. An electronic tachometer as in claim 1, wherein said variable gain amplifier is a two quadrant multiplier.

3. An electronic tachometer as in claim 1, wherein said integrating means comprises an resistine-capacitine network connected in said first feedback loop.

4. An electronic tachometer as in claim 1, wherein said control signal providing means comprises an analog summer, and a signal processor coupled to the output of said summer.

5. An electronic tachometer as in claim 4, including low pass filter channels coupled to the means for applying a position signal; said switching means being responsive to said low pass filter channels for controlling the signals applied to said summer.

6. An electronic tachometer as in claim 4, including means for applying a fixed reference signal to said variable gain amplifier.

7. An electronic tachometer as in claim 6, including a diode network coupled to the output of said signal processor for selectively controlling the application of said control signal and said reference voltage to said gain amplifier.

* * * * *